April 27, 1943. J. H. SEATON 2,317,409
METHOD FOR STRESS-RELIEVING PLASTICS
Filed Jan. 5, 1940
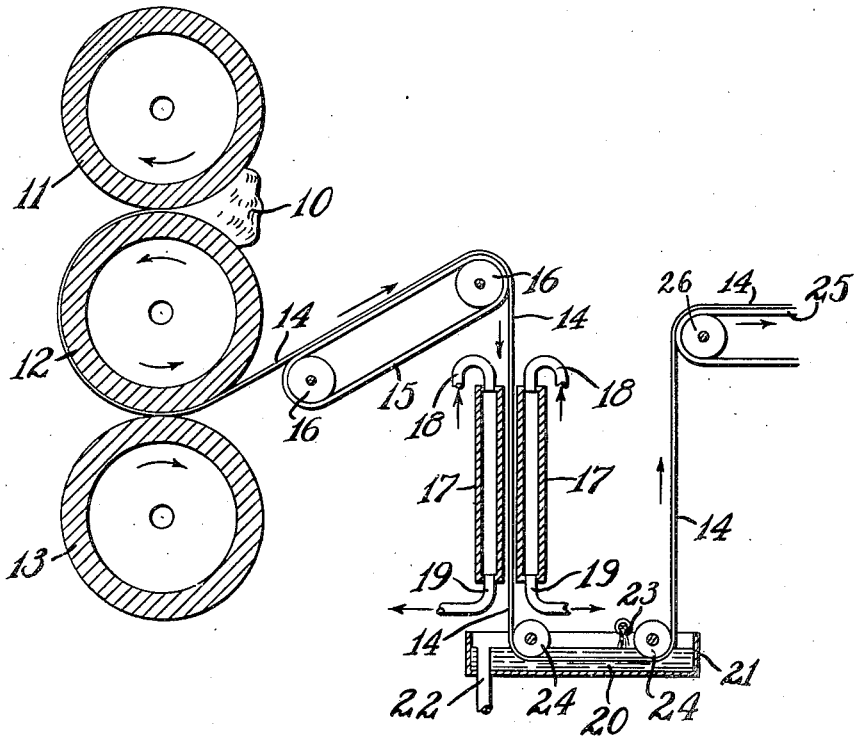
Inventor
John H. Seaton
By Willis F. Avery
Atty Patented Apr. 27, 1943

2,317,409

UNITED STATES PATENT OFFICE 2,317,409

METHOD FOR STRESS-RELIEVING PLASTICS

John H. Seaton, Akron, Ohio, assignor to The B. F. Goodrich Company, New York, N. Y., a corporation of New York Application January 5, 1940, Serial No. 312,543

4 Claims. (Cl. 18—48)

This invention relates to a new method for relieving internal stresses from plastic materials.

When plastic materials are formed into sheets, tubes, threads, etc., products having internal stresses are ordinarily produced. Thus, when a plastic material is calendered, the resulting sheets exhibit a pronounced grain across the sheet which manifests itself in an abnormally small longitudinal extensibility. This effect is generally considered to be caused at least in part by the fact that the plastic is calendered at somewhat elevated temperatures, and is of necessity deformed in the shaping process so that at the instant in which it acquires its final shape it is considerably stressed in a longitudinal direction, and is then more or less chilled as it leaves the calender roll so that further change in shape is prevented or greatly retarded. The same effect is noted when plastic materials are extruded from heated dies to form threads or tubes.

These anisotropic products are undesirable for a number of reasons. The longitudinal extensibility is considerably diminished, which imparts to the sheet or other product abnormally low resistance to tear in one direction. An even more serious defect resides in the fact that any such product has a constant tendency which greatly increases at elevated temperatures to relieve the internal stresses. Thus, heating an anisotropic calendered sheet of plastic material causes the sheet to shrink longitudinally, and if this shrinkage is prevented, sufficient stresses may be set up inside the sheet to rupture the sheet.

It has been common practice to relieve the internal stresses in anisotropic sheets, tubes, threads, etc., of plastic material by heating the material at a suitable high temperature for a sufficient length of time to permit the internal stresses to relieve themselves and produce a substantially isotropic product. Prior procedures have not been entirely satisfactory due to the fact that irregularities in shape ordinarily occurred due to contact of the plastic material with its supporting structure during shrinkage. The plastic bodies have been heated by conduction or convection, which caused buckling and warping due to the shrinkage of the exterior of the sheet, tube, thread, etc., before the interior became heated. In some cases, and especially where bodies of substantial thickness were involved, the products were in a more unsatisfactory condition after the treatment than before, for the stresses had been removed from the surface but remained in the center of the material.

It is an object of this invention to produce uniform, substantially isotropic products from anisotropic sheets, rods, threads, etc., made of plastic material.

It is another object of this invention to relieve the stresses in plastic materials in such a manner that no new stresses are introduced by shrinkage of the material in contact with a support.

It is another object of this invention to relieve the stresses in the inside of such anisotropic plastic masses at substantially the same time as the stresses are removed from the outside of such masses.

These and other objects are accomplished by heating by radiant energy anisotropic plastic material subjected to no substantial frictional drag in the heating zone.

The invention may be better understood from the accompanying drawing illustrating a modification of the invention. A mass of plastic material 10 is passed between calender rolls 11 and 12, around roll 12, and between rolls 12 and 13, which may be heated by any desired means. The sheet 14, containing many internal stresses and stretched longitudinally, is carried by the endless belt 15 mounted upon the driven rolls 16, 16 into position for the stress relieving operation. The sheet 14 is then passed vertically downward between two radiant heaters in such a manner that the sheet is subjected to substantially no frictional drag while being heated. The heaters shown comprise iron casings 17, 17 through which steam or other heating fluid may be introduced at openings 18, 18 and carried away at openings 19, 19. While the sheet 14 is being passed through the heating zone, it is free to shrink or stretch in any manner necessary to relieve internal strains without the introduction of new strains occasioned by dragging the sheet over any supporting means as it shrinks. After leaving the heating zone the sheet passes under rolls 24, 24 and is cooled by the water or other cooling fluid 20 in the container 21 which is provided with an overflow 22 at the opposite end of the container 21 from the spray 23. This cooling or chilling operation is applied to the hot sheet before the sheet is placed under any tension which might stretch the same. The stress-free sheet 14 is then conveyed away by the endless belt 25 passing around roll 26 driven at a speed less than the speed of belt 15 to compensate for the longitudinal shrinkage undergone by the sheet 14 in the heating zone.

It is obvious that the invention is not limited to the specific radiant heating means employed, for electric radiant heating elements or other means may be employed instead of the steam radiator with equally satisfactory results. Heating by other forms of radiant energy such as induced high-frequency currents, cathode rays, etc. is within the broad scope of this invention. Whatever the source of radiant energy, superior results are obtained due to the generation of heat throughout the mass of the plastic rather than application of heat only at the surface.

The method of this invention is applicable to a variety of plastic materials such as rubber, rubber derivatives such as rubber hydrohalides, synthetic rubbers such as neoprene, olefin-polysulfides, polymerized butadiene, and copolymers of butadiene with styrene or acrylic nitrile, vinyl plastics such as polyvinyl acetal, polystyrene, polyacrylic esters, copolymers of vinyl acetate and vinyl chloride, organic cellulosic plastics such as cellulose acetate and cellulose nitrate. The stress-relieving process is especially valuable in the manufacture of sheets to be used as interlayers in safety glass, and thin strips to be wound upon conductors as insulation, or as a step in the preparation of any other products in which anisotropic sheets, tubes, threads, etc. may be undesirable.

The rubber-like, resilient materials produced by plasticizing gamma polyvinyl chloride are particularly benefited by the method of this invention, for calendered sheets of this material often contain internal stresses of such magnitude that they shrink to nearly half their length when heated. As a specific example, gamma polyvinyl chloride is plasticized with an equal weight of tricresyl phosphate, and is calendered at about 120° C. to form a thin sheet. This calendered sheet will shrink to about two-thirds its original length, with accompanying increases in thickness and breadth, when heated by radiant heat to about 150° C. The product is a flat, uniform sheet with few internal stresses, and can be accordingly reheated with inconsequential change in dimensions.

When less amounts of plasticizer are used the calendered sheet must be heated to a higher temperature to remove the internal stresses. Thus calendered sheets of gamma polyvinyl chloride containing one-fourth its weight of plasticizer must be heated to over 200° C. to remove the internal stresses.

Although I have herein disclosed specific embodiments of the invention I do not intend to limit the invention solely thereto for many variations and modifications are within the spirit and scope of the invention as defined in the appended claims.

I claim:

1. The method of relieving the stresses from lengths of anisotropic thermoplastic material, produced by progressive deformation of a mass of the material, which comprises progressively moving the material in a vertical direction through a heating zone in which it is exposed to radiant energy sufficient to raise its temperature to a point at which internal stresses are relieved, the material being out of contact with any supporting structure and substantially free from tension during its passage through the heating zone.

2. The method of relieving the stresses from lengths of anisotropic thermoplastic material, produced by progressive deformation of a mass of the material, which comprises progressively moving the material vertically downward through a heating zone in which it is exposed to radiant heat sufficient to raise its temperature to a point at which internal stresses are relieved, the material being out of contact with any supporting structure and substantially free from tension during its passage through the heating zone.

3. The method of relieving the stresses from lengths of plasticized gamma polyvinyl chloride material, produced by progressive deformation of a mass of the material, which comprises progressively moving the material vertically downward through a heating zone in which it is exposed to radiant heat sufficient to raise its temperature to a point at which internal stresses are relieved, the material being out of contact with any supporting structure and substantially free from tension during its passage through the heating zone.

4. The method of relieving the stresses from a calendered sheet of plasticized gamma polyvinyl chloride which comprises progressively moving the sheet vertically downward between radiant heating elements to raise its temperature to a point at which internal stresses are relieved, and chilling the sheet as it leaves the heating zone, the sheet being out of contact with any supporting structure and substantially free from tension during its passage through the heating zone.

JOHN H. SEATON.